W. H. SAUNDERS.
Thill-Coupling.

No. 31,091 {87,}

2 Sheets--Sheet 1.

Patented Jan. 8, 1861.

Witnesses
John McCarthy
Lomax Littlejohn

Inventor
W. H. Saunders

W. H. SAUNDERS.
Thill-Coupling.

No. 87,31,091.

2 Sheets—Sheet 2.

Patented Jan. 8, 1861.

UNITED STATES PATENT OFFICE.

WILLIAM H. SAUNDERS, OF HASTINGS, NEW YORK.

COUPLING FOR CONNECTING THILLS TO THE AXLES OF CARRIAGES.

Specification of Letters Patent No. 31,091, dated January 8, 1861.

*To all whom it may concern:*

Be it known that I, WILLIAM H. SAUNDERS, of Hastings, Westchester county, in the State of New York, have invented a new and useful Improvement in Couplings for Connecting the Shafts of Carriages with the Fore-Axles; and I do hereby declare that the following is a full, clear, and exact description thereof, reference being had to the accompanying drawings, making part of this specification, in which—

Figure 2:
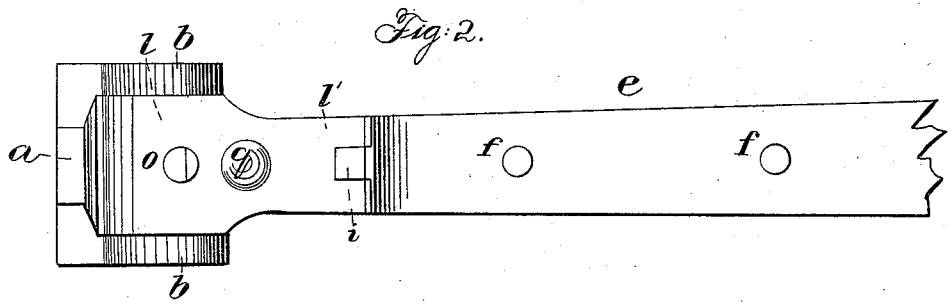
Figure 1:
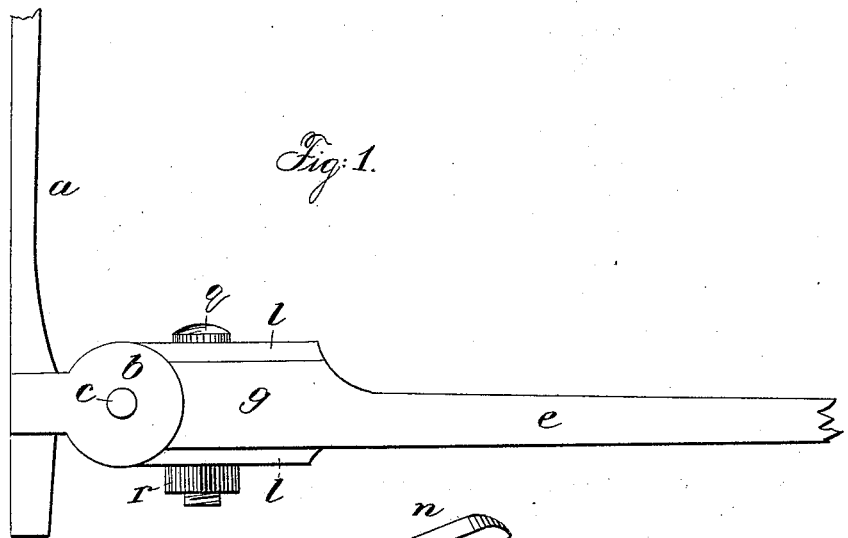
Figure 5:
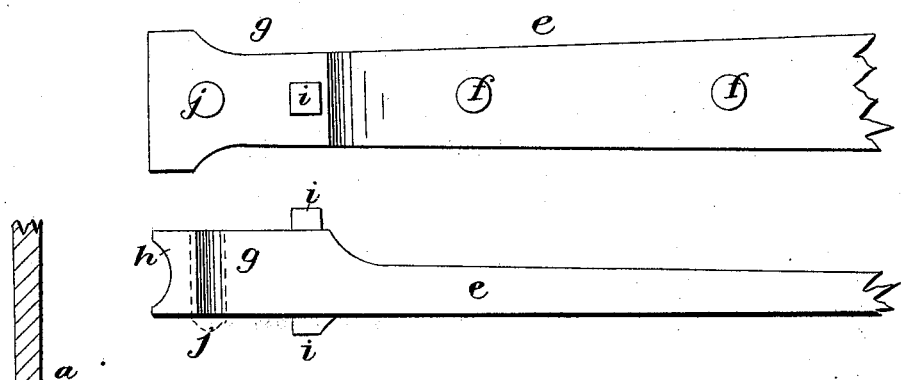
Figure 3:
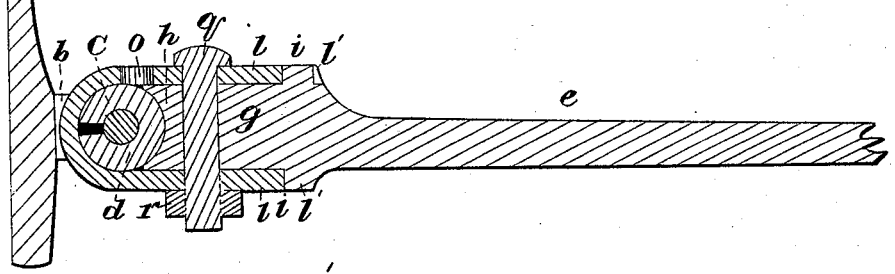
Figure 4:
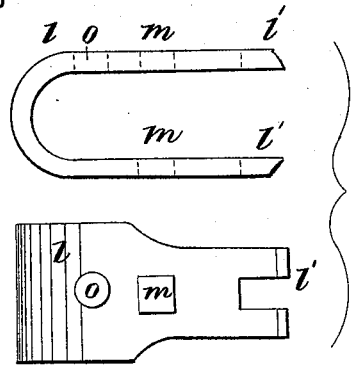

Figure 1, is a side elevation of the coupling; Fig. 2, a plan; Fig. 3, a longitudinal vertical section; Fig. 4, separate plan and side view of the strap; Fig. 5, separate plan and side view of the center piece; and Fig. 6, a view of the pincers employed in putting on the couplings.

The same letters indicate like parts in all the figures.

The object of my said invention is to make the couplings which connect the shafts of a carriage with the fore axle in such manner that while they allow the required vertical motions of the shafts all jar, noise and wear of the parts will be effectually prevented.

In the accompanying drawings (*a*) represents the piece of iron in the rough from which carriage makers form the usual clip to go around the fore axle. It is deemed unnecessary to represent the clip completed as the couplings are usually made and sold to carriage makers with the piece (*a*) as represented ready to be formed into a clip to suit any carriage. The clip piece (*a*) has the two ears (*b*, *b*) with the required space between them, and the center pin (*c*) on which the coupling turns. The pin (*c*) is represented as permanently secured to the ears. On the pin (*c*) is put a cylindrical tube made of vulcanized india rubber (*d*) or other equivalent elastic substance, which is split along its entire length to admit of putting it onto the pin. This tube should extend over the whole length of the pin between the ears.

The center piece (*e*) Fig. 5, is forged or otherwise constructed of any desired form to fit the rear end of the wooden shafts, and provided with holes (*f*, *f*) to receive rivets or other suitable means of fastening to the shafts. The rear end (*g*) is formed with parallel sides and of a width to fit accurately, but freely between the ears of the clip, and of a thickness a little less than the outer diameter of the elastic tube (*d*) and with the rear face (*h*) presenting a socket in the form of a segment of a hollow cylinder to fit against the elastic tube when compressed.

From the upper and lower surfaces project studs (*i, i*) one at top and one at bottom, and in, or near the middle of the width, and about midway between the studs and the rear end there is a bolt hole (*j*) passing through the thickness.

To effect the coupling there is a metal strap (*l*) the top and bottom of which are parallel and fit accurately over the rear end (*g*) of the center piece, and with square sockets (*l′, l′*) to fit onto the studs (*i, i*) and with holes (*m*) to correspond with the bolt hole (*j*) in the center piece. The rear end is semicylindrical, and when bolted onto the center piece the two surround the elastic cylindrical tube (*d*) in a compressed state.

Figure 6:
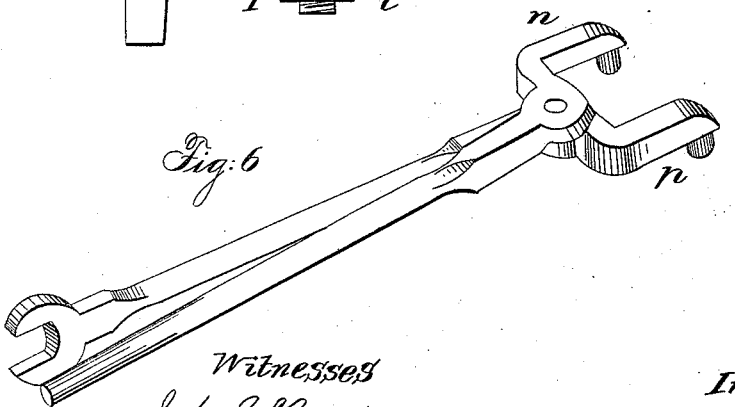

To put on the coupling the elastic tube (*d*) is first put on the pin (*c*) of the ears. The strap (*l*) is then forced over the tube which for the purpose must be slightly compressed. The rear end of the center piece (*e*) is then inserted in the strap, and for the purpose of compressing the elastic tube (*d*) between the two to bring the holes (*j*) and (*m*) in line a pair of pincers Fig. 6, are employed. One jaw (*n*) is inserted in a hole (*o*) made for that purpose in the strap, and the other jaw (*p*) is placed against one of the studs (*i*) of the center piece and by grasping the handles of the pincers, the center piece, and strap, are drawn together, compressing the elastic tube (*d*) between them until the holes (*j*) and (*m*) coincide, and then a securing bolt (*q*) is inserted and secured with a nut (*r*) or by other suitable means. By the use of pincers in the manner above described the securing bolt (*q*) can be readily liberated and the uncoupling readily effected.

From the foregoing it will be seen that as the coupling with the pin of the clip is effected by the center piece and strap surrounding it and with the elastic tube interposed and in a compressed state there can be no jar, rattle, or wear of the metal parts, while at the same time the shafts will be free to vibrate up and down; and as the strap and center piece can only be bolted together by compressing the elastic tube between them it follows that this elastic tension tends constantly to force them apart so that this tension results in a constant gripping of the securing bolt (*q*) so that it cannot come out even if the nut should come off. In this way I am enabled to couple the shafts of a carriage with its fore axle by means which admit of ready coupling and uncoupling and of the required freedom of motion up and down, without jar or rattle, tendency to wear, and without the possibility of accidental disconnection thus avoiding all the disadvantages and risks heretofore experienced.

I am aware that couplings for the shafts of carriages have heretofore been made with an elastic tube interposed between the pin of the clip and the coupling, and that the elastic tube has been compressed in fastening the coupling, but in such case the security of the coupling was made to depend entirely on the nut of the securing bolt, so that in the event of that becoming unscrewed the shafts would be liberated, and therefore I do not wish to be understood as making claim broadly to the use of a compressed elastic tubing between the coupling and the pin, nor to the use of a split elastic tube in couplings to avoid the necessity of making the pin of the clip with a securing nut.

What I do claim as my invention, and desire to secure by Letters Patent, is—

The combination of the center piece, strap, elastic tube and pin of the clip, substantially as specified, whereby the tension of the elastic tube causes the center piece and strap between which it is compressed, to grip and hold the bolt or equivalent by which they are secured to each other, as set forth.

W. H. SAUNDERS.

Witnesses:
JOHN MCCARTHY,
LOMAX LITTLEJOHN.